United States Patent [19]

Kozak

[11] 4,333,002
[45] Jun. 1, 1982

[54] MULTIPLE DEVICE CONTROL APPARATUS

[75] Inventor: Norman M. Kozak, Greendale, Wis.

[73] Assignee: A. O. Smith Corporation, Milwaukee, Wis.

[21] Appl. No.: 182,864

[22] Filed: Sep. 2, 1980

[51] Int. Cl.³ .............................................. H05B 1/02
[52] U.S. Cl. .................................. 219/321; 219/483; 219/486; 307/39; 307/40
[58] Field of Search ................ 219/320, 321, 483–486, 219/497, 508, 509, 510; 307/39–41, 118, 117

[56] References Cited

U.S. PATENT DOCUMENTS

| | | | |
|---|---|---|---|
| 3,586,869 | 6/1971 | Kompelien | 219/486 |
| 3,770,977 | 11/1973 | McIntosh | 219/486 |
| 3,787,729 | 1/1974 | Bennett | 219/486 |
| 3,952,182 | 4/1976 | Flanders | 219/486 |
| 4,058,702 | 11/1977 | Jerles | 219/486 |
| 4,110,632 | 8/1978 | Wyland | 307/39 |
| 4,181,950 | 1/1980 | Carter | 307/39 |

Primary Examiner—B. A. Reynolds
Assistant Examiner—M. Paschall
Attorney, Agent, or Firm—Andrus, Sceales, Starke & Sawall

[57] ABSTRACT

A step controller for a water heater having a plurality of individual electrical heating elements changes the number of energized elements to maintain a predetermined minimum temperature. A thermistor sensor monitors the temperature of the water and generates a proportional signal. Preset potentiometers establish set point temperature signal and a dead band signal. The number of "on" elements is related to the difference between the sensed water temperature and the preset water temperature divided by the dead band factor. The heating elements are turned "on" and "off" in a predetermined sequence whenever a change is required. The sequence includes turning on the heating element which has been off for the longest period and turning off the heating element which has been on for the longest period. The controller includes a microprocessor unit to periodically sense the signals of the sensor and potentiometer and to store the on-off status of the heating elements and the historical sequence of when each heating element was turned on or off in relationship to all of the other heating elements. The microprocessor periodically updates the status by processing the last read and stored signals to determine the number of elements which should be "on", compares it to the actual number of elements on, and creates appropriate control signals for turning the individual element on and off in proper sequence.

8 Claims, 1 Drawing Figure

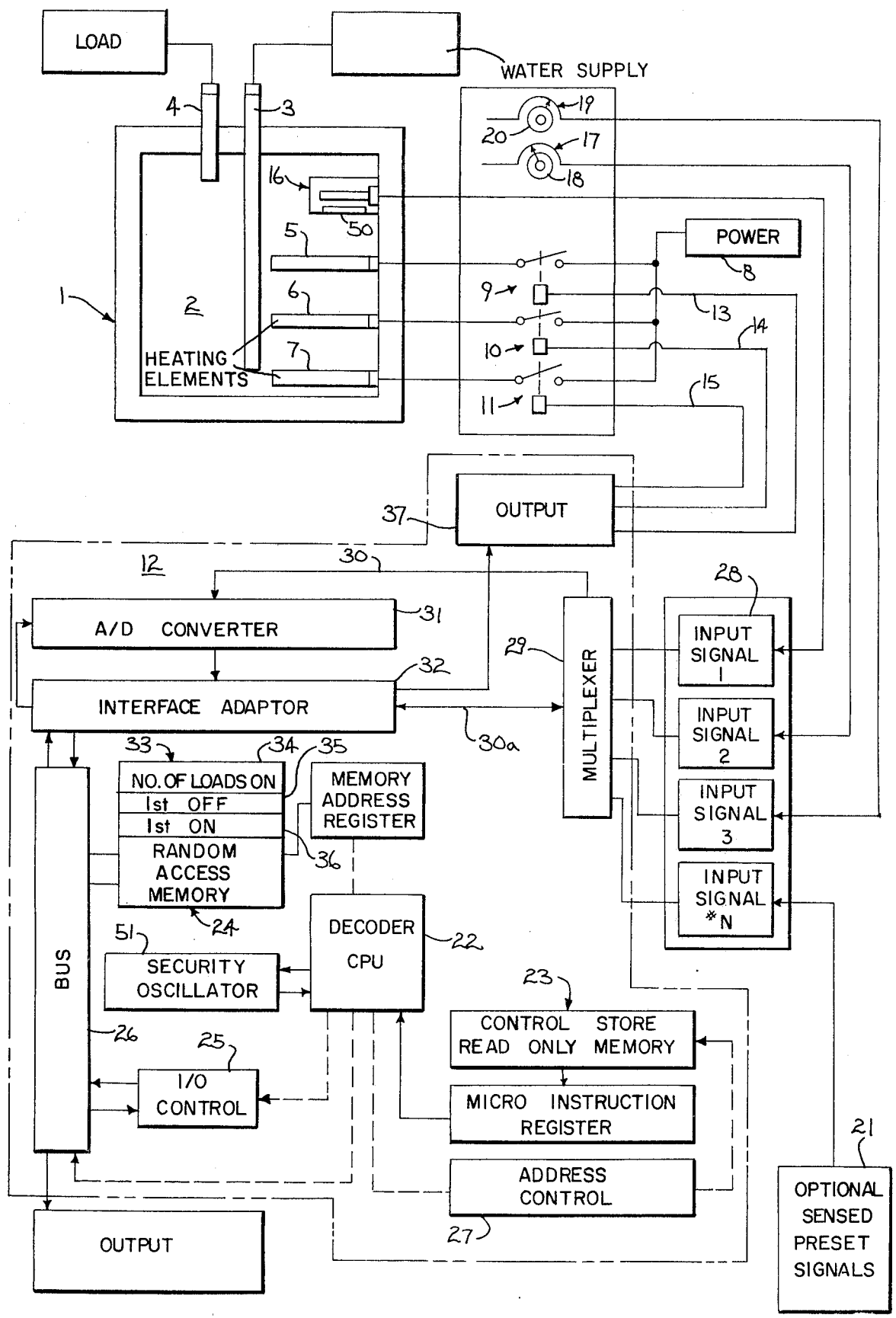

MULTIPLE DEVICE CONTROL APPARATUS

BACKGROUND OF THE INVENTION

This invention is directed to a multiple device control apparatus for a multiple inputted load apparatus and particularly to a step-type controller for a water heater or like load means having a plurality of selectively actuated heating elements.

Multiple input apparatus may include a plurality of individual actuated load inputs for controlling the state of or conditioning the load apparatus by sequential and selective actuation of such plurality of inputs. For example, water heating apparatus may be constructed with a plurality of individual heating elements or units rather than one single modulated element for varying the thermal energy inputted into the stored water. The heat input may be conveniently controlled by varying of the number of the heating elements which are activated at any given time. The actuation of the heating elements may be varied depending upon the temperature of the stored water, the time of day, the anticipated usage, the recovery rate requirements and any other factor or condition which can effect the heat input requirement. In such a system, it may be desirable to provide for particular types of sequential operations of the load devices. This in turn requires proper sensing and monitoring of status of all such load input devices as well as the various control factors, and then controlling the load or element activations in accordance with the predetermined relative sensed and monitored conditions.

SUMMARY OF THE PRESENT INVENTION

The present invention is particularly directed to a step-type controller for a load having a plurality of individual inputs which are to be individually and separately activated in a predetermined sequence based on a plurality of different load and operating factors. The invention has been particularly applied to and is therefore described in connection with a water heater having a plurality of individual electrical heating elements. The number of heating elements energized is dependent upon the required thermal energy input requirements for raising and holding the temperature of the water at a predetermined minimum temperature. The total number of heating elements on at anytime is to be related to the difference between the actual water temperature and the preset desired water temperature, allowing for an appropriate differential span or dead band to prevent hunting in the control system. The heating elements in an optimum system are activated in a predetermined sequence which includes turning on the heating element which has been off for the longest period and turning off the heating element which has been on for the longest period. Generally, in accordance with the present invention, sensing means monitor the temperature of the water and generates a proportional signal. Corresponding presettable input signal sources are provided for establishing a corresponding set point temperature signal and preferably an interrelated temperature span or dead band signal. Various other control signal sources may also be provided and processed for interrelated control of the operation of the loads. The controller includes a logic unit, which preferably includes a microprocessor unit, to correspondingly and periodically sense the conditions of the sensors and signal sources as well as monitoring and storing the on-off status of each of the heating elements and the historical sequence of when each heating element was turned on or off in relationship to all of the other heating elements. The microprocessor thus periodically updates the status by processing of the last read and stored signals to develop the difference between the actual and desired water temperatures, dividing the same by the span setting signal to provide for a predetermined acceptable variation and adding a constant to produce a number corresponding to the number of elements which should be in an activated state for that condition. Such number is compared with the actual number of elements then on, and if there is any deviation, appropriate control signals are generated to increase or decrease the number of activated elements to the predetermined and preset number for that temperature condition. The logic unit can readily store the historical sequence and when required turn off the load which has been on for the longest period or turn on the load which has been off for the longest period of time. The step controller then permits the selective control of the various load inputs in a predetermined manner to maintain most effective system operation.

The present invention permits individual programming and controlling a water heater or other similar device in accordance with individual customer demand and permits use of a single controller for widely varying requirements while maintaining most effective operation of the units.

DESCRIPTION OF THE DRAWING FIGURES

The drawing furnished herewith illustrates a preferred construction of the present invention in which the above advantages and features are clearly disclosed as well as others which will be readily understood from the following description.

The drawing is a diagrammatic illustration of a water heater unit incorporating a controller constructed with the teaching of the present invention.

DESCRIPTION OF THE ILLUSTRATED EMBODIMENT

Referring to the drawing, a water storage unit is shown including an insulated tank 1 filled with water 2. A supply inlet 3 is connected to the storage tank 1 from any suitable source, not shown, and an outlet 4 is shown for distributing of the water to the home or other consuming device. In the illustrated embodiment of the invention, three separate electrical immersion heating units 5, 6 and 7 are shown secured to the wall of the storage tank 1 extending into the water. The heating units 5-7 are connected to a suitable electrical source of power, shown generally at 8. The heating units 5, 6 and 7 are individually and separately connected to such power supply 8, and in the illustrated embodiment of the invention, are connected thereto by suitable separate activators, shown as electromagnetically actuated connectors or switches 9, 10 and 11. The switches 9-11 are adapted to be selectively activated by a suitable controller 12 which is shown having three individual outputs 13, 14, and 15 coupled respectively to the switches 9-11. The controller 12 is a microprocessor base controller which is adapted to selectively activate the individual outputs 13-15 in a predetermined logical sequence based on the operating condition of the hot water as well as historical operating status of the heating elements 5, 6 and 7. In the illustrated embodiment of the invention, a temperature sensor 16, such as a well known thermister probe, is coupled to the storage tank 1 to sense the temperature of such water. Sensor 16 develops an electrical condition signal proportional to the temperature of the water 2. The sensor 16 is connected as one input to the controller 12. In addition, a set point signal generator or unit 17 is provided for generating a related set point signal corresponding to the desired temperature. A suitable manual dial 18 is provided for adjusting the setting of set point unit 17. The set point unit may be the well known potentiometer having an adjustable contact coupled to the dial 18. A span adjustment unit 19 provides a similar signal source for producing a differential temperature setting span or dead band signal. The span adjustment unit 19 includes its own separate control 20 for adjustment of a related electrical signal connected to the controller 12. The span signal requires a selected minimum difference in the preset temperature and the actual temperature before a change in the number of heating elements activated or deactivated is made. In addition, other monitored states may be inputted through one or more auxiliary controller inputs 21. Such optional inputs might, for example, include time of day, anticipate temperature changes, water usage or any other conditions which would be a factor in determining the particular number of heating elements 5–7 to be activated. More particularly, as applied to a water heating apparatus for providing hot water to a heating system the water may advantageously be heated at a rate inversely proportional to the outdoor temperature. For example, if the outdoor temperature were to increase by 10°, the water temperature may be decreased by some proportional level. If a one-to-ten ratio had been selected, the water temperature would be decreased by 1°. Any other relationship might of course be provided. Further, the electrical power companies, particularly for relatively large installations, may include a demand load charge at different periods and/or based on a usage level above some selected normal maximum. It may be desirable to limit the permitted maximum demand or load in accordance with certain characteristics, such as the outdoor temperature. Thus, if the outdoor temperature is below a given level, it may be necessary to provide maximum input to the water heater including simultaneous operation of all available heating elements to establish an adequate supply of hot water to the heating system. However if the outdoor temperatures should rise by some factor, such as by 10° to 20°, the necessity of providing maximum hot water may be significantly less even though the sensing system might temporarily demand such an input. Suitably monitoring of the outdoor temperature can be provided to limit the number of loads which can be turned on and thereby minimize the periods when maximum demand charges are applicable. In such a system, means might be used to continuously monitor the power consumed in relationship to the demand charges and provide a continuous modulation and related control of any desired characteristic. These and other similar inputs depending upon predetermined calculated conditions, sensed conditions or the like, can all be readily incorporated into the logic control of the sequence controller for any load device and the above examples as applied to a water heater are given for purposes of more clearly explaining the possible scope of the teaching of the present invention.

In the illustrated embodiment of the invention, the controller 12 includes a microprocessor 22 coupled to the individual signal sources including sensor 16 and preset temperature and span potentiometers 17 and 19. The microprocessor 22 is operable to continuously monitor, and record the corresponding input signals in appropriate form for logical processing. The microprocessor 22 may of course be conveniently located with respect to the storage tank 1 with appropriate access to an operator for adjustment of the various manually operable inputs.

The microprocessor in particular is programmed to sequentially read the condition sensor and other input units, relate such signals to each other at any given time to develop an energy consumption or demand signal which is used to energize selected ones of elements 5, 6 and 7 in a predetermined sequence.

The microprocessor 22 thus operates to periodically sample each of the sensor 16 and the input units 17 and 19 in a continuous cyclical manner, thereby continuously updating the record of the existing water temperature and the desired temperature. This information is directly stored within the microprocessor after appropriate processing, which may include appropriate weighting for various factors.

The difference between the actual and the desired temperature determines the number of elements 5, 6 and 7 which are to be energized. The microprocessor 12 further functions to energize the appropriate number of elements and to actuate them in sequence to turn on the element which has been off the longest and turn off an element which has been on the longest.

The microprocessor 22 is typically shown, as will be readily understood by those skilled in the art, in a functional block diagram in which the data storing and processing are controlled by an internal control unit with the sequential sampling, processing and storing of the temperature and related data. The system includes a ROM memory unit or section 23 within which a fixed program is provided for controlling of the logical and sequential inputting data, processing such data, storing such processed data and outputting of appropriate signals to activate the outputs lines 13–15 and thereby control energizing heating elements 5, 6 and 7. A RAM memory section 24 is provided for appropriate storing of data. Data is introduced and outputted through a suitable I/O unit 25 which is connected to the external system by the common bus structure 26. The routing is controlled by appropriate addressing and decoder unit 27, all under the control of the basic program stored in control unit 23. The microprocessor 22 of course includes the necessary arithematic and logic processing units which operate on the collected data and stored data in accordance with specific instructions contained within the memory control unit 18.

For example, a microprocessor manufactured and/or sold by Intel Corporation and identified as an Intel 8035 may be used. The operation and specific connection will be made depending upon the particular microprocessor 22 and will be readily understood by those skilled in the art particularly when taken with the flow chart attached hereto, and the program listing in the attached appendix "A" which provides one sequence for the outputting data based on the input devices as well as the necessary processing and storage of signals based on the combination of input signals and the historical signals.

More particularly, the sensor 16 and input devices 17 and 19 for the water heater are similarly connected by individual signal conditioning devices 28 to the input side of a multiplexer 27 having a common output line 30. The multiplexer 29 sequentially and cylically operates to couple one of the conditioning device 28 at a time to the output line 30 to transmit the corresponding temperature or other related signal under a processor control signal connection shown schematically by line 30a. The multiplexed inputs are analog signals. An analog-to-digital convertor 31 is connected to the output of the multiplexer 29 and is operable to convert each of the analog signals into an appropriate digital signals for processing by the digital microprocessor 22. A peripheral interface adaptor 32 of any suitable construction is provided for coupling of the digital signals to the microprocessor 22, via bus 26. The interface adaptor 32 functions in a well known manner as a gating device coupled to the common bus for establishing two-way communication between the temperature input section and the microprocessor 9 which permits transmitting of the processed signals, transmitting appropriate timing signals to the multiplexer and the like. The rate of sampling is controlled by a suitable timing means which may be directly derived or controlled by the microprocessor 9 in any suitable well known manner.

The adaptor 32 thus responds to signals from the processor 22 to transmit the signals to the multiplexer 29 and to the A/D converter 31 and thereby provide for reading the several inputs, converting such readings and transmitting the same to the microprocessor RAM memory 24. In addition, the microprocessor RAM memory has an appropriate storage section 33 in which the operating status of each of the heating elements 5, 6 and 7 is stored. The processor thus stores in a first location 34 in memory, the number of loads or elements 5, 6 and 7 which are energized. In addition, the first element previously turned off is recorded in a second location 35 and the first element of the operating element turned on is stored in further memory location 36.

The output from the microprocessor 22 is coupled by an output signal conditioner 37 which includes a suitable signal converter such as an RS232C converter to transmit suitable analog signals to the appropriate electromagnetic unit 9-11.

In operation, the microprocessor based controller 12 continuously monitors the input data on a periodic basis. The several analog input signals from the sensor 16 and from the presettable input signal sources 17 and 19 are time multiplexed to the A/D converter 31 and the appropriate digital representation stored in the computer data RAM memory 24. The program is a periodically activated and for example, as shown in flow chart attached hereto, operates on the last stored signals to determine the number of elements 5, 6 and 7 which should then be operating based on the stored data. In particular, the microprocessor 22 determines the difference between the water temperature and the temperature setting as recorded in the data memory, and divides such difference by the span setting to determine whether or not the differential exceeds the acceptable difference. A constant is added to produce a condition number indicative of the number of elements to be then operating. The final condition number is then compared with the existing number of elements 5, 6 and 7 then in the "on" state, as stored in the microprocessor memory 34. If the numbers agree, no action is required and the microprocessor 32 returns to other normal task until the next period required for updating of the load status. If a difference exists, the appropriate heating element 5, 6 or 7 is turned on, or off, in a particular sequence.

Thus, if the number differs and indicates more elements should be operating, the microprocessor 22 continues to process the data to determine which de-energized element has been off for the longest period, and generates an output to that load line 13, 14, or 15 to turn on the corresponding heating element 5, 6 or 7. If conversely the comparison indicates that an element should be turned off, the processor 22 determines which of the then operating elements 5, 6 or 7 has been on for the longest period. After such determination, the processor 22 deactivates the signal line 13, 14 or 15 for such element resulting in turn off of the corresponding element.

After turning "on" or "off" of an element or elements, the microprocessor 22 returns to other normal tasks until the next sampling and updating of the status of energization of the elements. The processor of course updates the status storage sections 34-36 of memory unit 24 for proper processing and subsequent control of the energization elements 5-7.

As noted previously, any other plurality of input options can be multiplexed into the unit to provide for a desired operating sequence and control. The system may also provide for additional logical factors for controlling the operating sequence and activation of the individual elements without a significant change in the system controller. The several elements may, for example, have certain different characteristics which may be used to change the sequence. Such information can of course be readily stored within the microprocessor unit by inputting of the corresponding load characteristic into the system design.

The attached flow chart details on sequence of the logic system and includes all significant steps to the various usual subroutines, such as those providing for mathematical calculations such as multiplication and division as well as various timing which might be provided. The mathematics subroutines have not been included because they are of a general known sequence and can be readily provided by those skilled in the art. The program listing of Exhibit A is complete for a five step controller having a two port microprocessor and for a forty to one hundred and forty degree Fahrenheit range. The listing will be readily followed and understood by those skilled in the art, particularly in view of the illustrated embodiment and above description, and is only briefly summarized herein.

Referring to the attached program flow chart, the main program is shown in Chart 1 and includes the usual initialization of the system for reading and conversion of the analog input signals to appropriate digital form. If the sensor connection is open circuited, the loads are automatically turned off, as noted at 38. If not, the program proceeds to read and store the temperature setting, the span dial setting, and the thermister temperatures.

The illustrated system is set for controlling the water within selected ranges and the program establishes the appropriate temperature range scale factors. Control units have been constructed with controlling ranges of 40 to 140 degrees F., 90 to 190 degrees F., and 140 to 240 degrees F.. In a practical design, each range uses a temperature probe and an associated temperature probe conditioning circuit designed for that temperature range as well as the appropriate data constants stored in the program memory. In addition, in order to obtain the desired resolution and linearity from the temperature probe conditioning circuit, each range is separated into a low and high range section. For example, the illustrated 40 to 140 degrees F. range, a low range section may include 40 to 90 degrees F. and a high range section 90 to 140 degrees F. The program flow chart diagrams the range switching which is of course produced by the necessary hardware and software in the controller.

Thus, as shown in chart 1, depending which range is employed, the signal is processed through an appropriate channel 39 or 40 with the appropriate data. For example, if the reading exceeds the low range section for the particular range, the system switches to the opposite high range section and is fed back into the system to again read the thermister temperature, as at 41. The signal is thereby processed through the appropriate range channel by pointing to the appropriate data constants, and setting an appropriate signal to apply the proper scale factor to the temperature setting in a multiplied data from program memory unit, as at 42. The modified sensor signal is then processed and compared to the temperature setting and the scale factor applied to the sensitivity setting, as at 43. The load calculation is then made based upon the difference between the actual temperature and the temperature setting divided by the sensitivity plus a load control factor, which is shown in the flow chart as a factor of two. This provides an algorithm function identifying the number of loads which should be on, or off, for that condition. The calculated value is compared to the number of loads on and off to establish data signal for the number of loads to be turned on or off, as at 44. The signal is processed to calculate the number of loads on or off, depending upon whether the temperature of the sensor is greater or less than the temperature setting. If the actual temperature is greater than the temperature setting the number of loads on are calculated by the difference of the maximum number of loads factor minus the function value from the previous calculation. If the temperature is less than the temperature setting, a calculation for the number of loads on is made by adding of the maximum load factor, the previously calculated function valve plus one. In either step, the calculated value is applied to a program sequence subroutine 45 which is operable to calculate the next load to be turned on or off, as noted in a flow chart. The output therefrom is applied to a switching time sequence 46 to calculate the optimum time for the next load switching, the output of which is applied to an appropriate timer subroutine 47 to delay the actual switching until the desired next load switching.

The sequence is then recycled as shown at 48.

The program sequence subroutine 45 is shown in Chart II with the appropriate processing of the signals for a two port processor unit. If a processor with a greater number of ports is used, a table could be provided for selection of the appropriate port.

The subroutine 45 determines the number of loads and compares the calculated number to be on, and if they are not equal, jumps to a subroutine to determine which is the next load to be turned on or off. The load(s) to be turned on or off is thus determined and such data stored in the memory, as at 49. The program steps to the subroutine 46, shown in Chart III, for calculating a minimum switching time based on the magnitude of the difference in the temperature setting. The switching time signal is applied to a timer control subroutine. In this illustrated embodiment, a hardware timer is used and the time controlled through an interupt subroutine which can be readily provided by those skilled in the art. Generally, the time between switching of the loads on is related to the total temperature change to allow as rapid a control as permissible without adverse loading of the power system. A suitable minimum switch time sequence is shown in Chart IV.

Obviously, in addition to such illustrated subroutines, other suitable or conventional subroutines are provided; for example, an off subroutine may be provided for turning off of all loads in the event of system malfunction; multiply divide and point subroutines are of course provided as well as an analog-to-digital conversion subroutine for use in the main and other subroutines.

This and similar detal can readily be provided and are not set forth to avoid undue polixity of the application. Appropriate listings are found in the program listing submitted with the application for file wrapper reference.

As previously noted, other controls can be incorporated into the controller or system operation. For example, a low water level cut off circuit may be incorporated into the system to turn off all loads if the water level drops below a selected level; for example, below the level of the temperature sensor 16. In such a system, a water level sensor 50 may be incorporated into the probe unit as diagrammatically illustrated in FIG. 1. If the water level drops below the level of the probe, the water level sensor 50 produces a reset signal which is coupled to the microprocessor which responds by turning all loads off. Simultaneously, a signal is transmitted to a reset input, not shown, of the microprocessor 12 which is set and held in a reset standby condition during which period the microprocessor program is not operating. If proper or desired water level is restored, the reset signal is removed and normal programming and operation automatically resumes.

An example of an internal control system which can be incorporated into the controller is a timer security which ensures functioning of the processor with respect to the proper sequential execution of instructions. The illustrated security circuit includes a separate internal oscillator circuit 51 which starts in the absence of signal pulses from the microprocessor 12. The output of the oscillator 51 in turn is connected to the reset input of the microprocessor 12. During normal operation, a software counter, now shown, is incorporated at selected points in the program. An internal timer of the microprocessor checks this count each time the counter is incremented. If the count in the counter is in agreement with a preset value, the microprocessor transmits an output interlock pulse to the oscillator 51. The output interlock pulses during proper operation occur at appropriate intervals to maintain the oscillator in the off state. Any disagreement between the checked count number and the preset value prevents creation of the output interlock pulse, and the oscillator 51 begins to operate to generate an output stop signal to the microprocessor. The microprocessor is activated to turn all loads off and to assume a standby position preventing programmed execution. Periodically the reset signal from the oscillator 51 is removed such that the microprocessor is allowed to restart at the beginning of its program.

The above and similar additions to the basic structure can of course be readily provided by those skilled in the art.

The present invention provides a highly versatile controller using the basic appropriate monitoring of various basic condition related factors and comparing such factors with a historical record to produce load related control outputs for a plurality of loads.

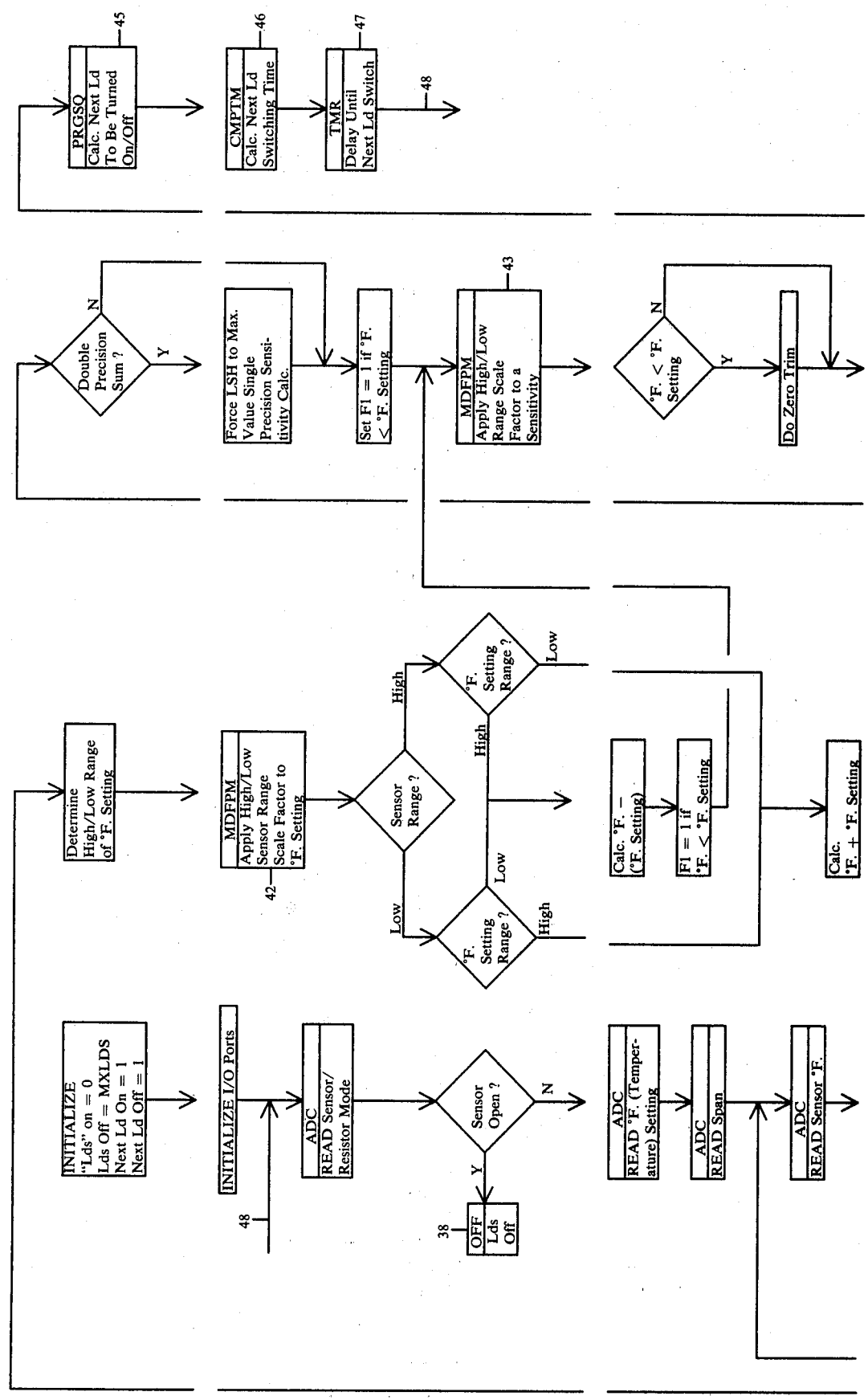
CHART 1 - MAIN PROGRAM

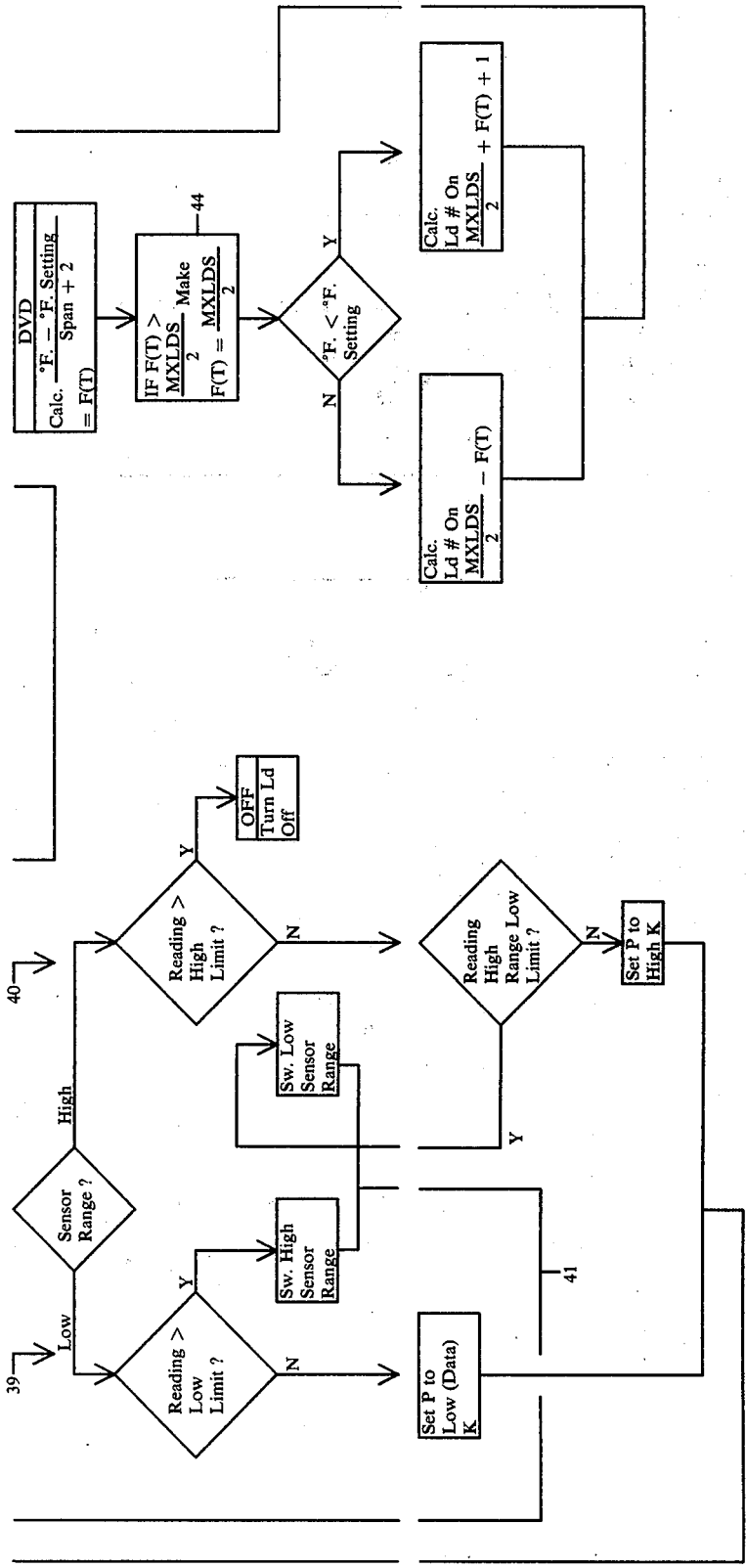

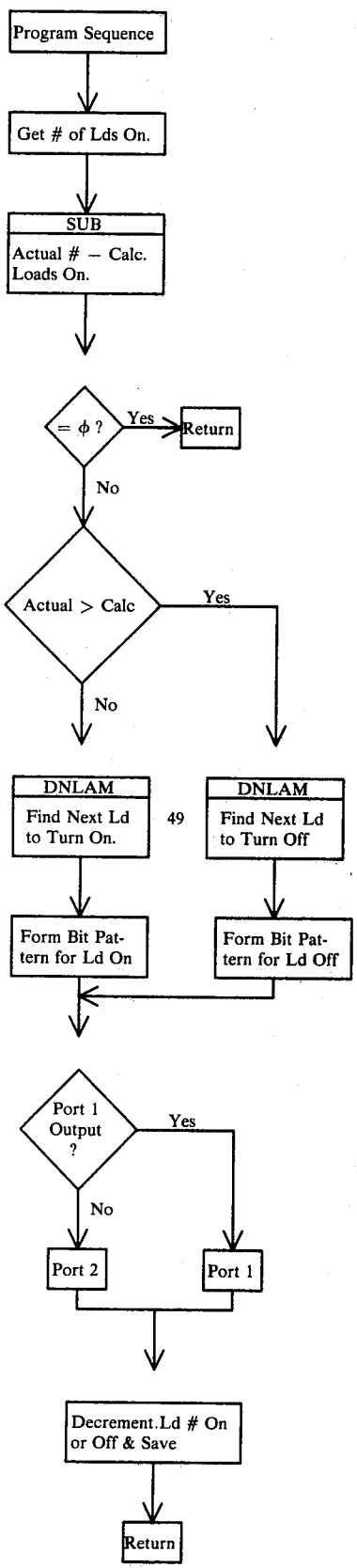
CHART II
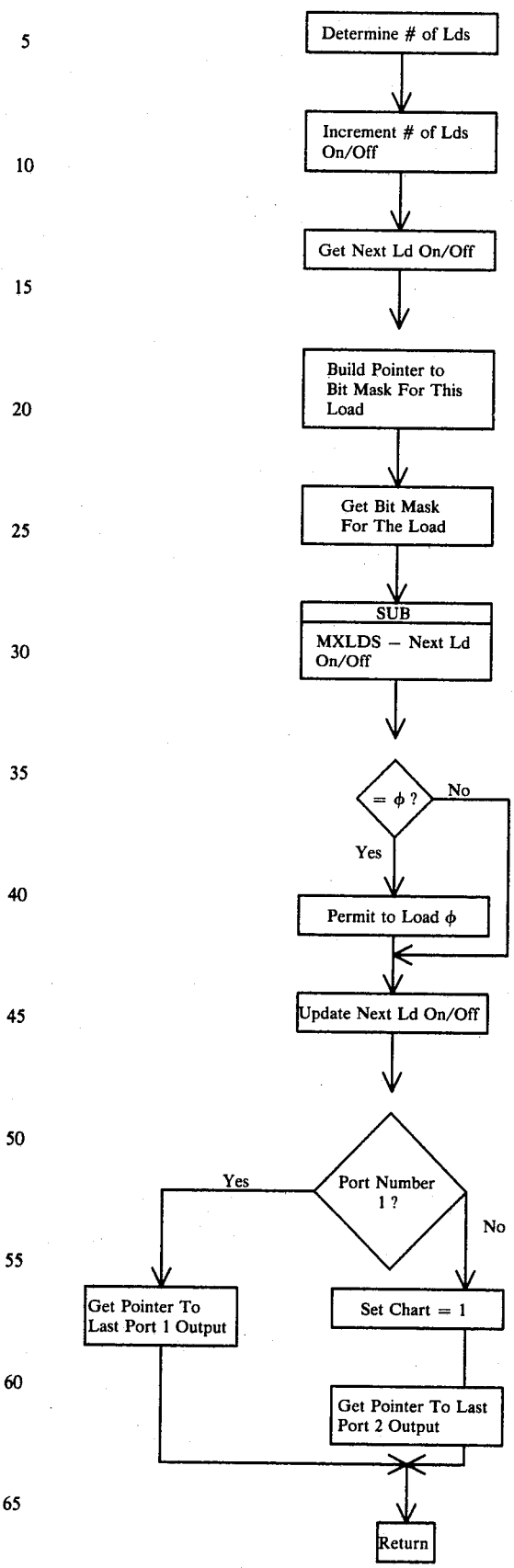
CHART III

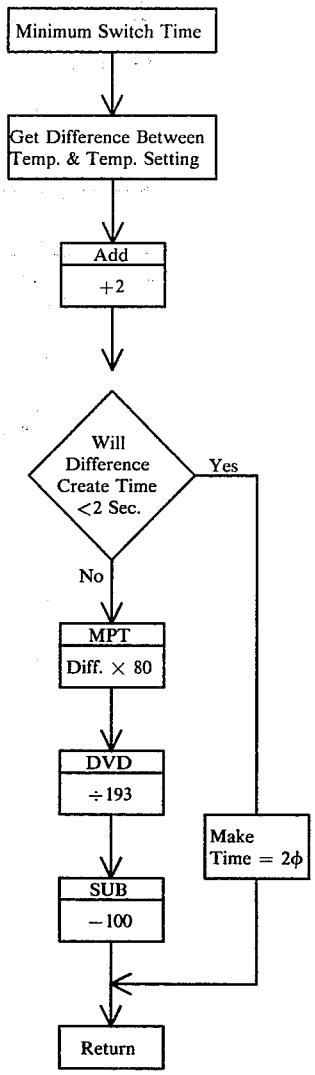

Various modes in carrying out the invention are contemplated as being within the scope of the following claims, particularly pointing out and distinctly claiming claims, particularly pointing out and distinctly claiming

I claim:

1. A water heater apparatus comprising a water storage tank having a plurality of separate electrical heating means, a plurality of power supply connectors one for each of said heating means, sensor means for sensing the temperature of the water, temperature present means for establishing a signal proportional to a predetermined desired temperature, status means to continuously record the number of heating means in operation, controller logic means for comparing the output of the sensor means and the preset means and the status of said heating means to control the number of activated heating means and to sequentially activate the heating means, said controller logic means being operable to turn on the separate heating means in accordance with the historical operation of said heating means, said sensor means and preset means establish proportional analog signals, said controller logic means includes a microprocessor having a RAM memory including storage locations containing a status number corresponding to the number of energized heating elements and individual status identification of the heating elements last activated and the heating element last deactivated, said microprocessor being operable to cyclically read and digitize said signals of the sensor means and the preset means and establish corresponding data numbers in said RAM memory for the actual temperature and the preset temperature, and said microprocessor being programmed to periodically determine the difference in the stored numbers for the actual temperature and the preset temperature and adding a fixed constant number thereto to generate a control number encoded to the number of elements to be activated for such control number and operable to compare said control number with said status number for generating individual control signals for each of said heating elements.

2. The water heater apparatus of claim 1 including a span preset signal means for establishing an analog signal corresponding to a selected variation in the temperature from the preset temperature, said microprocessor cyclically reading said analog signal and establishing a corresponding span adjustment number and in calculating said control number divides said difference number by said span adjustment number.

3. The water heater apparatus of claim 1 or 2 wherein said controller logic means establishes said individual control signals in accordance with the historical operating sequence of said heating elements for turning on the longest deactivated heating means and turning off the longest activated heating means.

4. The apparatus of claim 1 wherein said heater apparatus is adapted to supply hot water to a heating system and including an outdoor air temperature sensing means and said controller logic means, is operable to modify the actuation of said heating means in accordance with the outdoor temperature conditions.

5. A control apparatus for a plurality of operating devices located to condition a load means, comprising a plurality of activators for said operating devices, condition preset means for establishing a preset condition signal corresponding to a selected condition, sensor means for monitoring the condition of the load means and establishing a load-related condition signal, a controller means connected to said preset means and to said sensor means and including output signal means for individual operation of said activators for variably activating the number of said operating devices, said controller means including status means monitoring the state of the operating devices and the historical sequence of activating said operating devices and further including logic means to compare the output of the sensor means and the preset means and the status means to establish the output signal means to operate a predetermined number of said operating devices in accordance with the difference signal and to establish the individual output signals in a predetermined sequence based on the present operating status and the historical sequence of the activating the operating devices, and a presettable signal means to establish a modifying signal in accordance with predetermined control factors, and said logic means including means to modify the control of the operative devices in accordance with said modifying signal.

6. The control apparatus of claim 5 wherein said status means records the number of operative devices then operating and the operating device thereof first turned on and the operating device first turned off in the non-operating devices.

7. The controller apparatus of claim 6 wherein the controller activates said operating devices in a sequence responsive to said status means including activating the operating device first turned off and deactivating the operating device first turned on.

8. The heating apparatus of claim 5 wherein said sensor means includes means to sense the power consumption and to modify the actuation of the operative devices in accordance with the power consumption.

* * * * *

UNITED STATES PATENT AND TRADEMARK OFFICE
CERTIFICATE OF CORRECTION

PATENT NO. : 4,333,002
DATED : June 1, 1982
INVENTOR(S) : Norman M. Kozak

It is certified that error appears in the above-identified patent and that said Letters Patent are hereby corrected as shown below:

Column 8, Line 12,     After "similar" cancel "detal" and substitute therefore --- detail ---;

Column 8, Line 44,     After "counter," cancel "now" -and substitute therefore --- not ---;

Column 15, Line 48,    Cancel entire line and substitute therefore --- the subject matter which is regarded as the invention. ---;

Column 15, Line 54,
CLAIM 1                After "temperature" cancel "present" and substitute therefore --- preset ---;

Column 16, Line 34,    After "means" insert --- , ---;

Column 16, Line 35,    After "logic" cancel "means," and substitute therefore --- means ---.

Signed and Sealed this

Second Day of November 1982

[SEAL]

Attest:

GERALD J. MOSSINGHOFF

Attesting Officer    Commissioner of Patents and Trademarks